Dec. 26, 1950  B. CHANCE  2,535,266
BLANKING PULSE GENERATING CIRCUIT
Filed Oct. 3, 1945
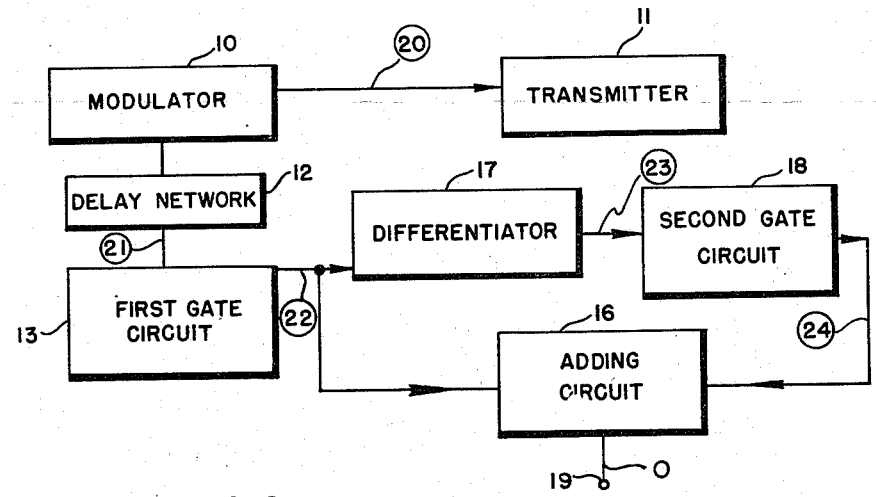
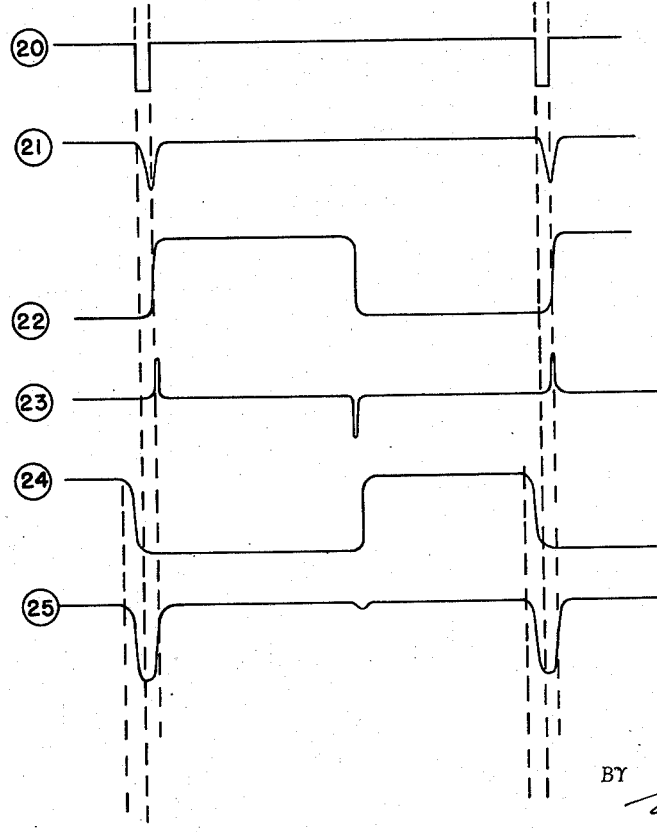
INVENTOR.
BRITTON CHANCE
BY William D. Hall.
ATTORNEY.

Patented Dec. 26, 1950

2,535,266

UNITED STATES PATENT OFFICE 2,535,266

BLANKING PULSE GENERATING CIRCUIT

Britton Chance, Cambridge, Mass., assignor, by mesne assignments, to the United States of America as represented by the Secretary of War Application October 3, 1945, Serial No. 620,131

6 Claims. (Cl. 250—27)

1

This invention relates generally to an electrical circuit and more particularly to a circuit for desensitizing a radio receiver for a specified length of time.

In one type of radio object detection system pulses of radio frequency energy are transmitted in a directional beam. Certain objects in the path of said pulses reflect a portion of the energy back to the radio object detection system as echo pulses. Each reflected echo pulse is caused to enter a receiver channel where it is detected, amplified, and presented as a visible display.

Since a portion of the energy in each transmitted pulse may enter the receiver channel directly and cause damage, it may be desirable to desensitize the receiver channel during the transmission of each pulse. The transmitter trigger pulse itself cannot be used as a blanking pulse since the delay inherent in coupling circuits would not allow the receiver to be desensitized during the exact interval of the transmitted pulse.

In one type of radio object detection apparatus the frequency with which pulses are emitted, known as the pulse repetition frequency and abbreviated P. R. F., may be subject to random variations; hence it may be desirable to extend the desensitized period of the receiver channel so as to include pulses having the greatest deviation in time that is likely to occur.

One object of this invention is to provide a desensitizing circuit in the receiver channel to render the receiver channel inoperative for the duration of the transmitted pulse.

Another object is to make said desensitizing circuit provide sufficient anticipation of the transmitted pulse to take care of the shortest transmitted pulse interval which is likely to occur.

A further object is to permit the receiver to recover almost instantaneously after each transmitted pulse has ended.

Other objects, features and advantages of this invention will suggest themselves to those skilled in the art and will become apparent from the following description of the invention taken in connection with the accompanying drawings in which:

Fig. 1 shows a block diagram of a circuit embodying the principles of this invention; and Fig. 2 shows waveforms which will be used in the explanation of the operation of this circuit.

Referring now more particularly to Fig. 1 for a description of this invention, modulator 10 supplies a series of negative voltage variations, hereafter referred to as negative trigger pulses, to radio frequency transmitter 11 and to delay network 12. In one type modulator known as a spark gap modulator, a disc is caused to rotate with a constant velocity. Spaced at intervals around the circumference of this rotating disc are protruding pins. As each pin passes a reference point, an electrical discharge constituting a trigger pulse is produced.

Each negative trigger pulse causes the transmitter to emit pulses of radio frequency energy. Hence, these trigger pulses occur at the P. R. F. of the system. Curve 20 of Fig. 2 shows the approximate appearance of these negative trigger pulses appearing at points 20 of Fig. 1. The negative trigger pulses have been greatly expanded in the drawing to facilitate the explanation of the operation of the circuit of this invention. The period between the pulses may be some 500 times the width of each pulse. The interval between the pulses must be longer than the time required for a pulse to travel over twice the distance corresponding to the maximum range sensitivity of the system. This allows a short interval before each transmitted pulse during which no reflected echo signal is likely to return.

The negative trigger pulses are also applied to delay network 12 and delayed an amount equal to the width of the trigger pulse. The delay network may be a simple resistance-capacitance network of a type well known to those skilled in the art. The approximate negative output pulses of delay network 12 appearing at point 21 of Fig. 1 will be similar to curve 21 of Fig. 2.

First gate circuit, 13, is actuated by the negative output pulses of delay network 12. First gate circuit 13 produces a series of positive rectangular voltage pulses hereafter referred to as gate pulses. Curve 22 of Fig. 2 shows the approximate appearance of these positive gate pulses which occur at point 22 of Fig. 1. The duration of the first positive gate pulse is approximately equal to one-half of the period between the negative output pulses shown by curve 21 of Fig. 2.

First gate circuit 13 may include a flip-flop multivibrator circunt. The flip-flop circuit is well known in the art and is described on page 50 of "Time Bases" by O. S. Puckle, published in 1943 by John Wiley and Sons, Inc.

The first positive gate pulse 22 is applied to adding circuit 16 and to differentiating circuit 17. In a differentiating circuit sudden changes in an applied potential produce a pulse whose polarity follows the direction of change. Differentiating circuits are well known in the art and are described on page 178 of the reference cited above.

The output of the differentiating circuit is shown by curve 23 of Fig. 2. A sharp positive pulse occurs at the leading edge of the positive gate pulse shown by curve 22 of Fig. 2 and a sharp negative pulse occurs at the trailing edge due to the action of the differentiating circuit.

This series of positive and negative trigger pulses is applied to a second gate circuit 18. Gate circuit 18 may be the same type flip-flop circuit as gate circuit 13. This flip-flop circuit is not responsive to positive trigger pulses and therefore will be actuated only by the negative trigger pulses. The approximate output gate pulse of the second gate circuit occurring at point 24 of Fig. 1 is shown by curve 24 of Fig. 2. It can be seen that the second positive gate pulse begins as the first gate pulse ends. The circuit elements of the two flip-flop circuits are adjusted so that the second positive gate ends just prior to the beginning of the negative transmitter trigger pulse immediately following the negative transmitter trigger pulse which actuated the first gate circuit.

The positive gate output of the second gate circuit 18 is applied to adding circuit 16. Adding circuits are well known in the art and may include a biased vacuum tube into whose control grid is injected both gate pulses. With the proper matching, both gate signals may be applied directly to the control grid of the vacuum tube. Otherwise the signals may be applied to separate electrodes of the vacuum tube.

Adding circuit 16 acts in the manner described above to combine the signals from the first and second gate circuits, 13 and 18, to produce an output waveform at terminal 19 as shown approximately by curve 25 of Fig. 2. The waveform represented by curve 25 of Fig. 2 is then a series of small insignificant pulses spaced between a series of large negative pulses. Each large pulse begins shortly before a negative transmitter pulse and ends when the negative transmitter pulse ends. These negative voltage pulses are referred to hereinafter as blanking pulses.

The blanking pulses from adding circuit 16 may be applied to the grids of one or several intermediate frequency amplifier stages in the receiver channel, not shown. The blanking pulse is suitable for desensitizing the receiver channel for the duration of the transmitted pulse.

The circuit is able to anticipate a transmitted pulse and hence allows for slight variations in the P. R. F. of the system. Both gate circuits can have as low as 50% duty cycle and they can therefore be designed for optimum stability with little attention being paid to the recovery time of the circuits. The removal of the negative gate from the grid of the intermediate frequency amplifier stage removes the negative bias on that stage and allows the receiver channel to be made sensitive immediately following the trailing edge of the transmitted pulse.

A flip-flop circuit may be designed so that it will be triggered with a positive trigger pulse as well as with a negative trigger pulse. Hence the output pulses shown by curve 21 of Fig. 2 may be a series of positive output pulses. Also the outputs of the gate circuits may be a series of negative pulses, resulting in positive blanking pulses. In this case, the receiver blanking pulses must be inverted before being applied to the grid of an intermediate frequency stage.

Alternatively, such positive blanking pulses may be applied to the cathode of an intermediate frequency stage to effectively prevent that stage from conducting.

While there has been described what is at present considered to be the preferred embodiment of this invention, it will be obvious to those skilled in the art that various changes and modifications may be made therein without departing from the scope of the invention as set forth in the appended claims.

What I claim is:

1. A radiant energy system, comprising a source for providing a series of input pulses, a means for delaying said input pulses, supplied from said source, a first gate circuit receiving said delayed pulses, said first gate circuit producing a series of first gate pulses whose leading edges coincide with each of said series of input pulses, the duration of each of said gate pulses being less than the period between any two succeeding pulses in said series of input pulses, a differentiating circuit receiving the output of said first gate circuit, said differentiating circuit acting to produce a series of alternating trigger pulses coincident with the leading and trailing edges of said first gate pulses, a second gate circuit receiving the output of said differentiating circuit, said second gate circuit being responsive only to those trigger pulses which coincide with the trailing edges of said first gate pulses, said second gate circuit producing a series of second gate pulses of the same polarity as said first gate pulses, the leading edges of which coincide with the trailing edges of said first gate pulses, and the trailing edges of which occurs immediately prior to the leading edges of said input pulses, and a means fed from said gate circuits to combine said first and second series of gate pulses to produce a series of blanking pulses.

2. In a radiant energy system for producing a series of first pulses of short duration, a combination including a source of first pulses, a means coupled to said source for producing a series of first gate pulses the leading edges of which coincide with the trailing edges of each of said first pulses, a means connected to said first gate pulse producing means for producing a series of trigger pulses coincident with the trailing edges of said first gate pulses, a means connected to said trigger pulse producing means for producing a series of second gate pulses of the same polarity as said first gate pulses but the leading edges of which coincide with said trigger pulses and the trailing edges of which occur just previous to the leading edges of said first pulses, and a means for combining the output of said first and second gate pulse producing means to produce a series of blanking pulses.

3. In combination with a source of radiant energy for producing a series of first pulses of short duration, a means coupled to said source for producing a series of first gate pulses the leading edges of which coincide with the trailing edges of said first pulses and the trailing edges of which occur before the leading edges of the successive pulses of said series of first pulses, a means synchronized with said first gate pulse producing means for producing a series of second gate pulses of the same polarity as said first gate pulses the leading edges of which coincide with the trailing edges of said first gate pulses and the trailing edges of which occur immediately prior to the leading edges of the successive pulses of said series of first pulses, and a means for combining the output of said first and second gate pulse producing means to produce a blanking pulse for each of said first pulses.

4. In combination with a source of radiant energy for producing a series of first pulses, a means connected to said source for producing a series of first gate pulses synchronized with the trailing edges of said series of first pulses, a means having synchronizing connection to said first gate pulse producing means for producing a series of second gate pulses of the same polarity as said first gate pulses each of which ends previous to a successive pulse in said series of first pulses, and means for combining the output of said first and second gate pulse producing means to produce a blanking pulse for each of said series of first pulses.

5. A radiant energy system, comprising in combination, a means for producing a first and a second gate pulse of the same polarity and synchronized with a trigger pulse, the adjacent leading and trailing portions of said gate pulses being out of phase, and a means for combining said first and second gate pulses to produce a blanking pulse having leading and trailing edges respectively on either side of said trigger pulse.

6. A method for producing a series of pulses for blanking a radiant energy receiver during given periods of energy input thereto which comprises the mixing of a first series of gate pulses, the leading edges of which are coincident with the end of periods of the said energy input to said receiver, with a second series of gate pulses of the same polarity, the lagging edges of which occur immediately prior to the beginning of periods of said energy input, and the leading edges of which are coincident with the lagging edges of said first series of gate pulses.

BRITTON CHANCE.

REFERENCES CITED

The following references are of record in the file of this patent:

UNITED STATES PATENTS

| Number | Name | Date |
|---|---|---|
| 2,226,706 | Cawein | Dec. 31, 1940 |

FOREIGN PATENTS

| Number | Country | Date |
|---|---|---|
| 510,881 | Great Britain | Aug. 8, 1939 |